(12) United States Patent
Hicks et al.

(10) Patent No.: US 11,294,804 B2
(45) Date of Patent: Apr. 5, 2022

(54) TEST CASE FAILURE WITH ROOT CAUSE ISOLATION

(71) Applicant: International Business Machines Corporation, Armonk, NY (US)

(72) Inventors: Andrew C. M. Hicks, Wappingers Falls, NY (US); Diane Marie Stamboni, Poughkeepsie, NY (US); Joshua David Steen, Fishkill, NY (US); Gregg Arquero, White Plains, NY (US); Thomas William Conti, Poughkeepsie, NY (US); Michael Page Kasper, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/826,450

(22) Filed: Mar. 23, 2020

(65) Prior Publication Data

US 2021/0294735 A1 Sep. 23, 2021

(51) Int. Cl.
*G06F 11/00* (2006.01)
*G06F 11/36* (2006.01)
*G06F 11/07* (2006.01)

(52) U.S. Cl.
CPC ........ *G06F 11/3692* (2013.01); *G06F 11/079* (2013.01); *G06F 11/3688* (2013.01)

(58) Field of Classification Search
CPC . G06F 11/3692; G06F 11/3688; G06F 11/079
See application file for complete search history.

(56) References Cited

U.S. PATENT DOCUMENTS

| | | | |
|---|---|---|---|
| 7,620,876 B2 | 11/2009 | Lewis et al. | |
| 8,015,239 B2 | 9/2011 | Sharma et al. | |
| 8,615,684 B2 | 12/2013 | Hering | |
| 8,745,578 B2 | 6/2014 | Pistoia et al. | |
| 9,727,723 B1 | 8/2017 | Kondaveeti et al. | |
| 9,734,450 B2 | 8/2017 | Lingafelt et al. | |
| 9,858,413 B1 | 1/2018 | Zuo et al. | |
| 10,331,540 B2 * | 6/2019 | Coulthard | G06F 11/3688 |

(Continued)

OTHER PUBLICATIONS

Appendix 1 to the Oct. 2019 Update: Subject Matter Eligibility, p. 1-41 (Year: 2019).*

(Continued)

*Primary Examiner* — Jonathan D Gibson
(74) *Attorney, Agent, or Firm* — Cantor Colburn LLP; Teddi Maranzano

(57) ABSTRACT

Aspects of the invention include executing a first test case on a system, capturing a first state of the system during execution of the first test case, determining a first result of the first test case, performing a second execution of the first test case on the system in response to the first result of the first test case being an unexpected result, capturing a second state of the system during the second execution of the first test case, determining a second result of the first test case, analyzing the first state and the second state to determine a state similarity score, and categorizing the first result as a false positive based at least in part on the state similarity score being above a first threshold and a determination that the second result is a different result than the first result.

20 Claims, 6 Drawing Sheets

(56) References Cited

U.S. PATENT DOCUMENTS

| | | | |
|---|---|---|---|
| 10,338,993 B1* | 7/2019 | Lekivetz | G06F 11/0709 |
| 10,915,432 B2* | 2/2021 | Hong | G06F 11/3684 |
| 10,922,217 B1* | 2/2021 | Levi | G06F 11/3684 |
| 2015/0058826 A1 | 2/2015 | Hu et al. | |
| 2016/0292065 A1* | 10/2016 | Thangamani | H04L 41/064 |
| 2016/0292592 A1* | 10/2016 | Patthak | G06F 11/3086 |
| 2017/0293761 A1* | 10/2017 | Rhee | G06F 21/563 |
| 2018/0300229 A1* | 10/2018 | Kornfeld | G06F 11/3692 |
| 2018/0341573 A1* | 11/2018 | Patel | G06F 11/3684 |
| 2019/0080088 A1 | 3/2019 | Tock et al. | |
| 2019/0146903 A1* | 5/2019 | Hong | G06F 11/3692 714/38.1 |
| 2019/0155572 A1* | 5/2019 | Misra | G06N 20/00 |
| 2019/0158517 A1 | 5/2019 | Mudda et al. | |
| 2019/0227916 A1* | 7/2019 | Yedalla | G06F 11/3692 |
| 2019/0235997 A1* | 8/2019 | Mitchell | G06N 20/00 |
| 2019/0258803 A1* | 8/2019 | Murthy | G06F 11/3692 |
| 2019/0266023 A1 | 8/2019 | Buil et al. | |
| 2019/0327160 A1* | 10/2019 | Sivaprakasam | G06F 11/3688 |
| 2020/0296126 A1* | 9/2020 | Compagna | G06F 11/3692 |
| 2021/0081310 A1* | 3/2021 | Gottschlich | G06F 11/362 |
| 2021/0182179 A1* | 6/2021 | Zhou | G06F 11/3688 |

OTHER PUBLICATIONS

Jorwekar et al., "Automating The Detection Of Snapshot Isolation Anomalies," VLDB, Sep. 2007, 12 pages.

Koc et al., "Learning A Classifier For False Positive Error Reports Emitted By Static Code Analysis Tools," MAPL, Jun. 18, 2017, pp. 35-42.

Negi et al., "Dynamic Partition Bloom Filters: A Bounded False Positive Solution For Dynamic Set Membership," arXiv:1901.06493 [cs.DS], Jan. 19, 2019, 7 pages.

Rhode et al., "Dual-Task Agent For Run-Time Classification And Killing Of Malicious Processes," arXiv:1902.02598 [cs.CR], Feb. 7, 2019, 10 pages.

* cited by examiner

200

| State of System / Test Case Result | Same State | Different State |
|---|---|---|
| Same Result | Potential Bug | Software Bug |
| Different Result | False Positive | Unlikely Bug |

FIG. 2

TEST CASE FAILURE WITH ROOT CAUSE ISOLATION

BACKGROUND

The present invention generally relates to software testing, and more specifically, to root cause isolation for test case failure.

Software development and testing environments may implement a set of processes and programming tools to investigate a software product. Typically, users of software development, testing and production environments (e.g., software product developers) may use program logs, crash reports, and debuggers to investigate the quality of a software program or application. Testing a software product during a development cycle may be challenging. The larger the software product, the more source code to be tested, and the more challenging the testing may become. A software failure may occur during testing due to any number of things such as source code changes, requirement changes, and environment changes.

SUMMARY

Embodiments of the present invention are directed to a method for root cause isolation for test case failure. A non-limiting example computer-implemented method includes executing a first test case on a system, capturing a first state of the system during execution of the first test case, determining a first result of the first test case in response to executing the first test case, performing a second execution of the first test case on the system in response to the first result of the first test case being an unexpected result, capturing a second state of the system during the second execution of the first test case, determining a second result of the first test case in response to performing the second execution of the first test case, analyzing the first state and the second state to determine a state similarity score, and categorizing the first result as a false positive based at least in part on the state similarity score being above a first threshold and a determination that the second result is a different result than the first result.

Embodiments of the present invention are directed to a system for root cause isolation for test case failure. A non-limiting example system includes a processor configured to perform executing a first test case on a system, capturing a first state of the system during execution of the first test case, determining a first result of the first test case in response to executing the first test case, performing a second execution of the first test case on the system in response to the first result of the first test case being an unexpected result, capturing a second state of the system during the second execution of the first test case, determining a second result of the first test case in response to performing the second execution of the first test case, analyzing the first state and the second state to determine a state similarity score, and categorizing the first result as a false positive based at least in part on the state similarity score being above a first threshold and a determination that the second result is a different result than the first result.

Embodiments of the present invention are directed to a computer program product for root cause isolation for test case failure, the computer program product including a computer readable storage medium having program instructions embodied therewith. The program instructions are executable by a processor to cause the processor to perform a method. A non-limiting example of the method includes executing a first test case on a system, capturing a first state of the system during execution of the first test case, determining a first result of the first test case in response to executing the first test case, performing a second execution of the first test case on the system in response to the first result of the first test case being an unexpected result, capturing a second state of the system during the second execution of the first test case, determining a second result of the first test case in response to performing the second execution of the first test case, analyzing the first state and the second state to determine a state similarity score, and categorizing the first result as a false positive based at least in part on the state similarity score being above a first threshold and a determination that the second result is a different result than the first result.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts a table depicting four scenarios for the re-execution of the test case on the system according to one or more embodiments of the present invention;

Figure 1:
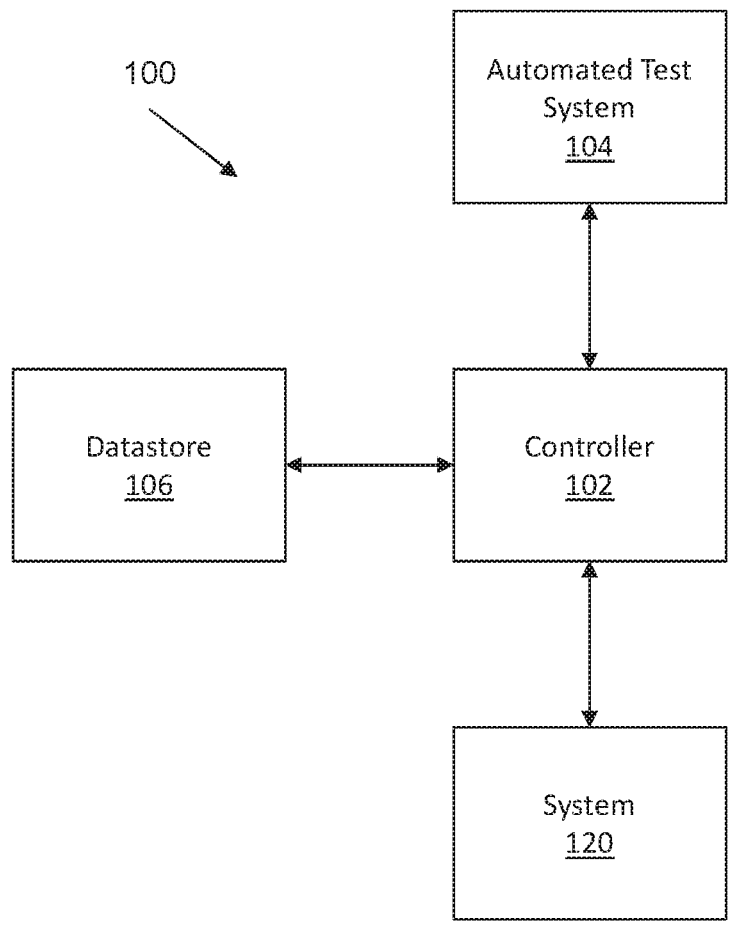
FIG. 1 depicts a block diagram of a system for root cause isolation for test case failure in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides an automated testing tool that reduces the number of false positive test results for automated test cases on a system. Automated testing (sometimes called "test automation") refers to the utilization of software that is separate from the software being tested for a system under test (SUT). Automated testing controls the execution of test cases and can compare the outcomes or results of the test cases to predicted outcomes. Automated testing can be utilized for testing, among other things, the confidentiality, integrity, and availability of data on the system. The execution of an individual test case can sometimes have an unexpected result. The cause of the unexpected result can be of interest to test engineers that may have been executing multiple other test cases and running various programs and processes on the system at the time that the test case was being executed. Aspects of the present invention determine how to categorize these unexpected results from the perspective of the test case being executed.

One or more embodiments of the present invention determine how to identify potential false positives indicating a potential bug in the system determined from an unexpected result (e.g., a system crash, etc.). An unexpected result from a test case can be caused by either the running of the test case itself or from some other program or process running on the system. To identify potential false positives indicating a system bug, a snapshot of the system can be taken during the runtime of the test case. The snapshot includes information on the system related to running applications, jobs, central processing unit CPU utilization, storage information, and the like. This information can be utilized to assist with categorization of an unexpected result from the test case.

In one or more embodiments of the present invention, when an unexpected result occurs during execution of a test case, the system snapshot is taken and stored. The test case can be re-executed to determine if the same unexpected result occurs or if a different result occurs during test case execution. A second snapshot of the system is taken during the re-execution of the test case to determine if the system state is the same (or similar) or if the system has a different state. With these two variables, a determination of the likeliness of a software bug can be determined or the test case result can be flagged for further follow up and inspection by a subject matter expert.

The following example scenarios are based on getting an initial unexpected result (or error) and re-executing the test case while taking a system state snapshot during each execution. If the re-executed test case is still getting the same error as the initial test case execution result and there was a system state change (i.e., the first system snapshot is different than the second system snapshot), then the error is likely to have been caused by the test case and a potential software bug exists. If the re-executed test case is still getting the error and there was no system state change, it is likely that the bug was caused by the test case, but more testing is needed to determine this. Also, if the re-executed test case is no longer getting the same result (e.g., error) and there was a system state change, it is unlikely the error or bug was caused by the test case and the result is unlikely to indicate a software bug. Finally, if the re-executed test case is no longer getting the error and there was no system state change, it is likely that the bug was not caused by the test case and that the results is potentially a false positive. Identifying the false positives shows whether an integrity flaw that is detected is an actual integrity defect or it was something peculiar about the testing environment. This allows for better prediction and understanding of integrity flaws that only exist because of the system environment or state. This also allows for an understanding of what types of software bugs can propagate to a production environment and would be integrity flaws in a customer system.

Turning now to FIG. 1, a block diagram of a system for root cause isolation for test case failure is generally shown in accordance with one or more embodiments of the present invention. The testing system 100 includes a controller 102, an automated test system 104, a datastore 106, and a system 120 (sometimes referred to as a system under test (SUT)). The controller 102 is configured to operate test cases on the system 120 and store results of the test cases and the state of the system during execution of the test cases in the datastore 106. The automated test system 104 is configured to generate test cases or a test suite (i.e., set of test cases) for execution for the system 120. The controller 102 can monitor the results of the test cases during execution on the system 120. When an unexpected result or error occurs, the controller 102 can take a snapshot of the system state at the time of the result of the test case. The system state is stored in the datastore 106. Responsive to this error, the test case is re-executed on the system 120 to determine if the same result (i.e., error) occurs or if a different result occurs. A different result can include the system 120 running normally and no error occurs and the result of the re-executed test case is an expected result. In addition to the re-execution of the test case, a snapshot of the system state during re-execution the test case is taken and stored in the database.

In one or more embodiments of the present invention, the controller 102 analyzes the results of the initial test case ("first result") and compares the first result to the results of the re-execution of the test case ("second result"). The test case is re-executed responsive to the first results being unexpected (e.g., causing a crash, causing a bug, etc.). The snapshot of the system state during execution of the initial test case can be referred to as the first snapshot and the snapshot of the system state during re-execution of the test case can be referred to as the second snapshot for ease of description below. The first result is compared to the second result to determine whether they are different. For example, if the first result caused the system 120 to crash and the second result did not cause the system 120 to crash, then the first result is different than the second result. If the first result caused the system 120 to crash and the second result also caused the system 120 to crash, then the first result is the same as the second result. In one or more embodiments of the present invention, the controller 102 analyzes the first snapshot of the system and compares it to the second snapshot of the system to determine whether the system states are the same or different. As mentioned above, the system state refers to information on the system 120 related to running applications, processing jobs, CPU utilization, storage information, and the like. In rare instances will two snapshots of the system state being the exact same when taken at two different time periods. A first snapshot of the system state is referred to herein as being the same as a second snapshot of the system state when the two snapshots have a state similarity score that is above a specified threshold similarity score. For example, if CPU utilization is 80% in the first snapshot and then 75% in the second snapshot, the state similarity score would be higher than if the second snapshot showed a CPU utilization of 20%. Other indications of the state of the system could include the name of the address spaces, jobs, or users active on the system as well as the resource being used by each. This includes not only CPU utilization but also the number of page frames used in memory, I/O activity, page faults, and program checks. It could also include things such as error messages, diagnostics, or health checks. Based on the system state similarity score between the first snapshot and the second snapshot being compared to a threshold, the controller 102 can determine whether the system states are the same or if the system states are different between the time the initial test case executed and the time of the re-execution of the test case.

FIG. 2 depicts a table depicting four scenarios for the re-execution of the test case on the system according to one or more embodiments of the present invention. The table 200 includes how a test cases is being handled based on the result of the re-execution of the test case whether the system state is the same or different. In a typical scenario, a first test case is run on the system 120 and a first result occurs. The first result, if unexpected (e.g., a system crash), would then trigger the re-execution of the first test case to determine a second result. As indicated in the table 200, if the second result is the same as the first result and the system state is different, then the test case is likely to have caused the unexpected result and there is likely a software bug. If the second result is different than the first result and the system state is different, then it is unlikely that the test case caused the error and there is unlikely a software bug. The other two scenarios are more ambiguous. If the second result is the same as the first result and the system state is the same, then the test case may have caused the error and there is potentially a software bug. In this scenario, further testing and/or investigation may be required. This scenario may cause the controller 102 to send an alert to a test engineer and have them follow up and investigate the issue. The last scenario occurs when the second result is different than the first result and the system state is the same. In this scenario, it is less likely that the test case caused the error and it is unlikely that a software bug exists. This scenario is referred to as a false positive that can be removed from consideration. When a test is run the system is attempting to prove if the errors that result are caused by the test. If the errors do not always occur during the test or appear to occur unrelated to the test then it is less likely the errors were caused by the test. Similarly if the activity on the system is different at the time of a test it could explain a difference in results.

In one or more embodiments of the present invention, the system 100 can re-execute the test case multiple times to further verify how to categorize the initial error in the system 120. For example, if re-executing the test case after an error when the system state is different, then another execution of the test case can be performed when the system state is the same (i.e., has a similarity score above a threshold). This allows for the results to be further analyzed and either confirm the likelihood of the cause of the error or flag the test case for follow up by a test engineer. If the same result occurs despite the system state being the same or different, then the confidence that a software bug exists can be greater than if the test case was just re-executed when the system state was the same.

Figure 3:
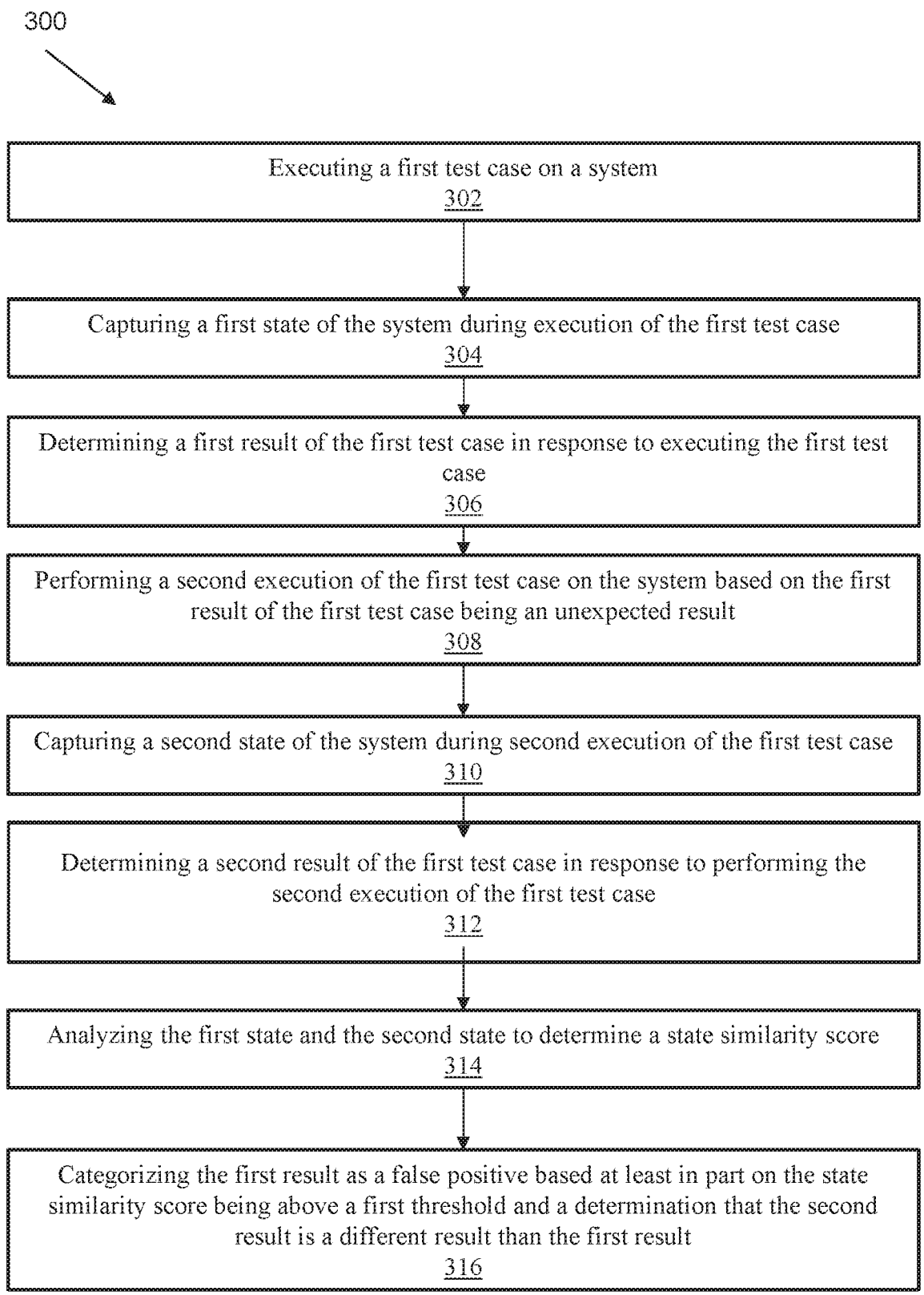
FIG. 3 depicts a flow diagram of a method for root cause isolation for test case failure according to one or more embodiments of the present invention.

FIG. 3 depicts a flow diagram of a method for root cause isolation for test case failure according to one or more embodiments of the invention. At least a portion of the method 300 can be executed, for example, by the automated tests system 104 shown in FIG. 1. The method 300 includes executing a first test case on a system, as shown in block 302. The test case can be any type of test case such as, for example, an integrity test on the system. At block 304, the method 300 includes capturing a first state of the system during execution of the first test case. The state of the system can include system information related to, for example, CPU utilization or other processes and programs running. At block 306, the method 300 includes determining a first result of the first test case. The method 300, at block 308, includes performing a second execution of the first test case on the system based on the first result of the first test case being an unexpected result. An unexpected result could be a system crash. The second execution of the first test case occurs when there is an unexpected result from the initial execution of the first test case. At block 310, the method 300 includes capturing a second state of the system during execution of the second test case. Also, at block 312, the method 300 includes determining a second result of the first test case. The method 300 then, at block 314, includes analyzing the first state and the second state to determine a state similarity score. At block 316, the method 300 includes categorizing the first result as a false positive based on the state similarity score being above a first threshold and a determination that the second result is a same result as the first result.

Additional processes may also be included. It should be understood that the processes depicted in FIG. 3 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
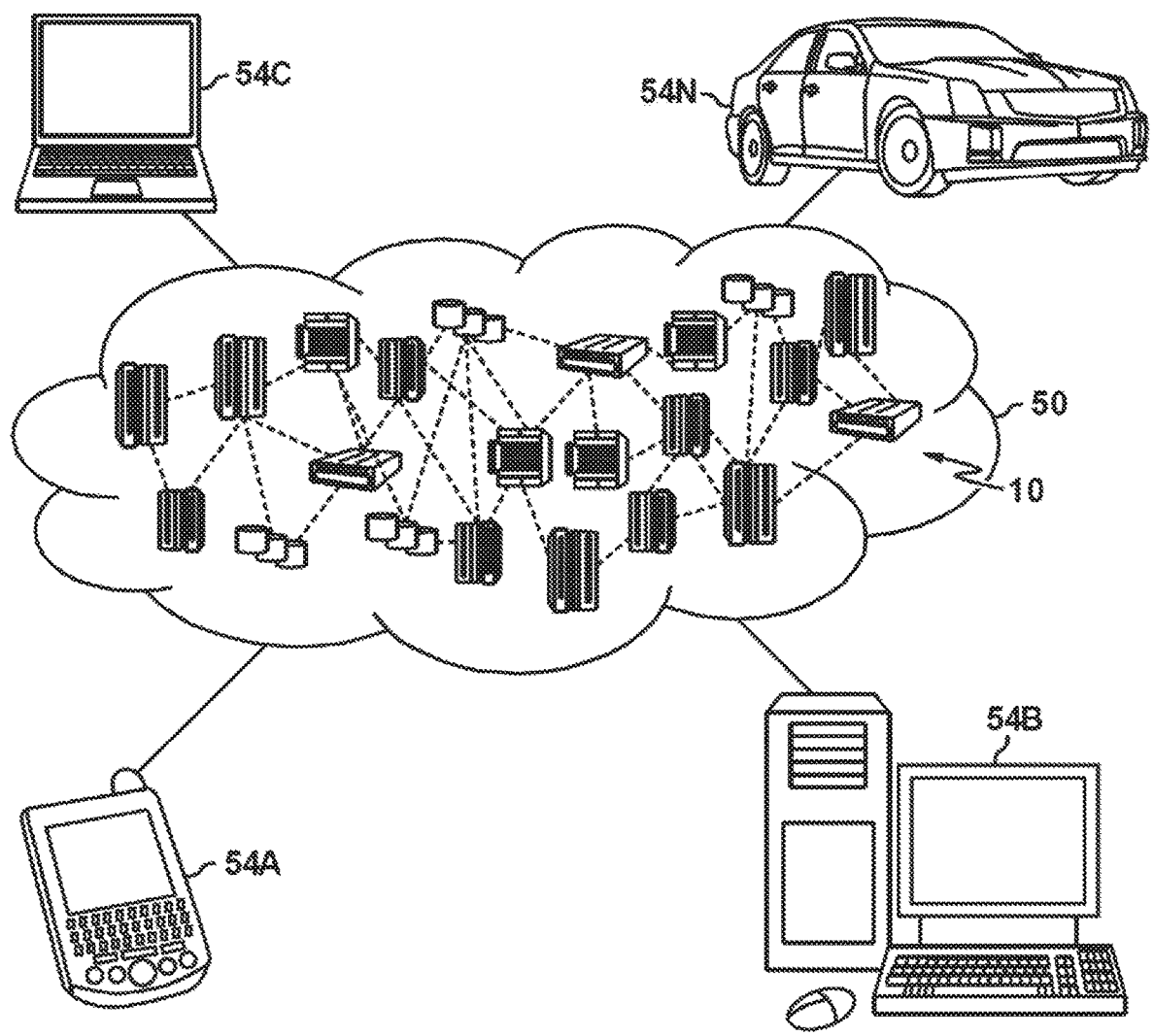
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
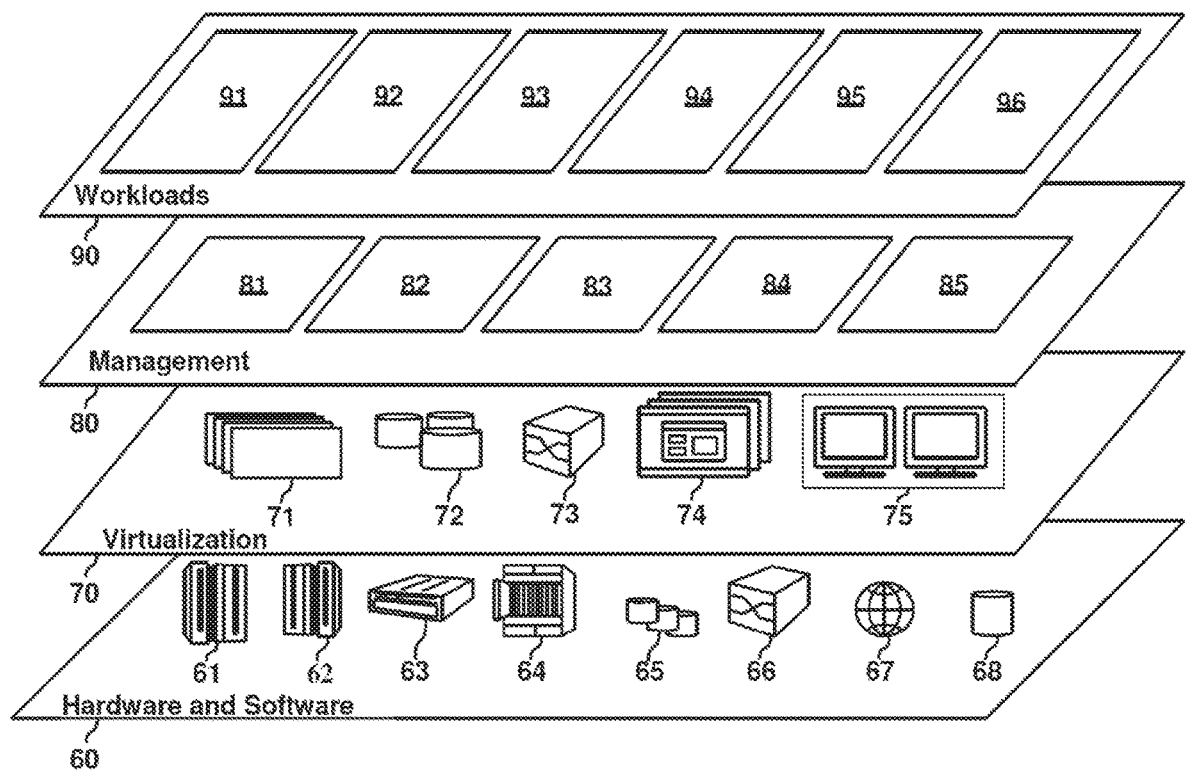
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case failure root cause isolation 96.

Figure 6:
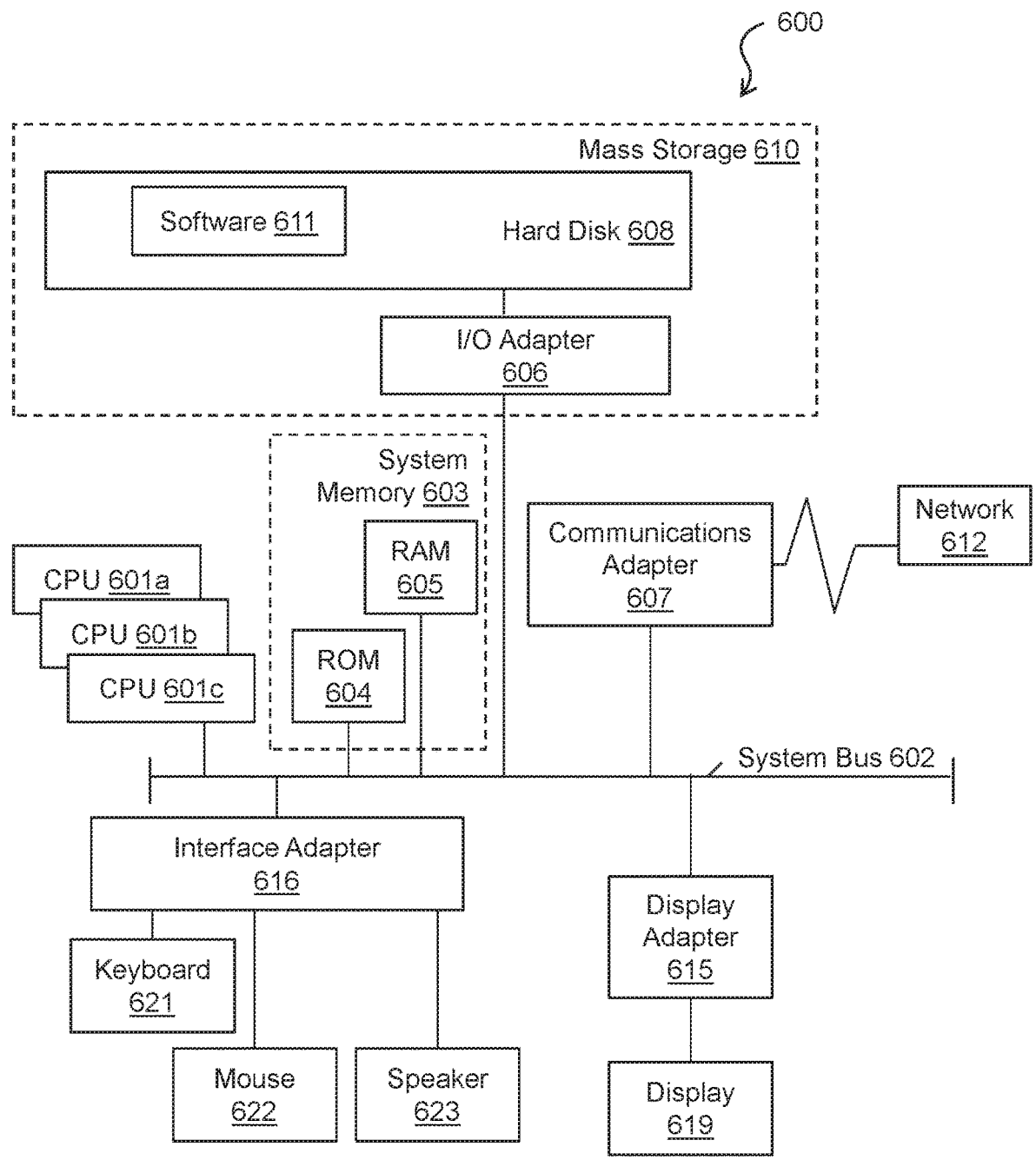
FIG. 6 depicts a block diagram of a computer system for use in implementing one or more embodiments of the present invention.

In one or more embodiments of the present invention, the controller 102 and any of the hardware/software modules in the system 100 from FIG. 1 can be implemented on the processing system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    executing, by a processor, a first test case on a computer system, wherein the first test case comprises a specification of inputs, execution conditions, and expected results for the computer system;
    capturing, by the processor, a first state of the computer system during execution of the first test case, the first state of the computer system comprising applications on the computer system running during the execution of the first test case, central processing unit (CPU) utilization for the computer system during the execution of the first test case, and storage information for the computer system;
    determining a first result of the first test case in response to executing the first test case;
    performing a second execution of the first test case on the system in response to the first result of the first test case being an unexpected result;
    capturing a second state of the system during the second execution of the first test case;
    determining a second result of the first test case in response to performing the second execution of the first test case;
    analyzing the first state and the second state to determine a state similarity score;
    categorizing the first result as a false positive based at least in part on:
        the state similarity score being above a first threshold; and
        a determination that the second result is a different result than the first result.

2. The computer implemented method of claim 1, further comprising:
    categorizing the first result as a software bug based at least in part on:
        the state similarity score being below the first threshold; and
        a determination that the second result is a same result as the first result.

3. The computer-implemented method of claim 1, further comprising:
    categorizing the first result as a potential software bug based at least in part on:
        the state similarity score being above the first threshold; and
        a determination that the second result is a same result as the first result.

4. The computer-implemented method of claim 1, further comprising:
    categorizing the first result as an unlikely bug based at least in part on:

the state similarity score being below the first threshold; and a determination that the second result is a different result than the first result.

5. The computer-implemented method of claim 1, further comprising:

monitoring a current state of the computer system;

determining a second similarity score between the current state of the computer system and the first state of the computer system;

performing a third execution of the first test case based on the second similarity score being below the first threshold; and determining a third result of the third execution of the first test case.

6. The computer-implemented method of claim 5, further comprising:

categorizing the first result as software bug based on a determination that the third result is a same result as the first result.

7. The computer-implemented method of claim 5, further comprising:

categorizing the first result as unlikely to be a software bug based on a determination that the third result is a different result than the first result.

8. A system comprising:

a memory having computer readable instructions; and one or more processors for executing the computer readable instructions, the computer readable instructions controlling the one or more processors to perform operations comprising:

executing a first test case on a computer system, wherein the first test case comprises a specification of inputs, execution conditions, and expected results for the computer system;

capturing a first state of the computer system during execution of the first test case, the first state of the computer system comprising applications on the computer system running during the execution of the first test case, central processing unit (CPU) utilization for the computer system during the execution of the first test case, and storage information for the computer system;

determining a first result of the first test case in response to executing the first test case;

performing a second execution of the first test case on the system in response to the first result of the first test case being an unexpected result;

capturing a second state of the system during the second execution of the second test case;

determining a second result of the first test case in response to performing the second execution of the first test case;

analyzing the first state and the second state to determine a state similarity score;

categorizing the first result as a false positive based at least in part on:

the state similarity score being above a first threshold; and a determination that the second result is a different result than the first result.

9. The system of claim 8, further comprising:

categorizing the first result as a software bug based at least in part on:

the state similarity score being below the first threshold; and a determination that the second result is a same result as the first result.

10. The system of claim 8, further comprising:

categorizing the first result as a potential software bug based at least in part on:

the state similarity score being above the first threshold; and a determination that the second result is a same result as the first result.

11. The system of claim 8, further comprising:

categorizing the first result as an unlikely bug based at least in part on:

the state similarity score being below the first threshold; and a determination that the second result is a different result than the first result.

12. The system of claim 8, further comprising:

monitoring a current state of the computer system;

determining a second similarity score between the current state of the computer system and the first state of the computer system;

performing a third execution of the first test case based on the second similarity score being below the first threshold; and determining a third result of the third execution of the first test case.

13. The system of claim 12, further comprising:

categorizing the first result as software bug based on a determination that the third result is a same result as the first result.

14. The system of claim 12, further comprising:

categorizing the first result as unlikely to be a software bug based on a determination that the third result is a different result than the first result.

15. A computer program product comprising a computer readable storage medium having program instructions embodied therewith, the program instructions executable by a processor to cause the processor to perform operations comprising:

executing a first test case on a computer system, wherein the first test case comprises a specification of inputs, execution conditions, and expected results for the computer system;

capturing a first state of the computer system during execution of the first test case, the first state of the computer system comprising applications on the computer system running during the execution of the first test case, central processing unit (CPU) utilization for the computer system during the execution of the first test case, and storage information for the computer system;

determining a first result of the first test case in response to executing the first test case;

performing a second execution of the first test case on the system in response to the first result of the first test case being an unexpected result;

capturing a second state of the system during the second execution of the first test case;

determining a second result of the first test case;

analyzing the first state and the second state to determine a state similarity score;

categorizing the first result as a false positive based at least in part on:

the state similarity score being above a first threshold; and a determination that the second result is a different result than the first result.

16. The computer program product of claim 15, further comprising:
  categorizing the first result as a software bug based at least in part on:
    the state similarity score being below the first threshold; and
    a determination that the second result is a same result as the first result.

17. The computer program product of claim 15, further comprising:
  categorizing the first result as a potential software bug based at least in part on:
    the state similarity score being above the first threshold; and
    a determination that the second result is a same result as the first result.

18. The computer program product of claim 17, further comprising:
  categorizing the first result as an unlikely bug based at least in part on:
    the state similarity score being below the first threshold; and
    a determination that the second result is a different result than the first result.

19. The computer program product of claim 15, further comprising:
  monitoring a current state of the computer system;
  determining a second similarity score between the current state of the computer system and the first state of the computer system;
  performing a third execution of the first test case based on the second similarity score being below the first threshold; and
  determining a third result of the third execution of the first test case.

20. The computer program product of claim 19, further comprising:
  categorizing the first result as software bug based on a determination that the third result is a same result as the first result; and
  categorizing the first result as an unlikely software bug based on a determination that the third result is a different result than the first result.

* * * * *